United States Patent
Wittmann

[19]

[11] Patent Number: 6,068,004

[45] Date of Patent: *May 30, 2000

[54] VESSEL CLEANING MACHINE INCLUDING AN INSPECTION DEVICE

[75] Inventor: Norbert Wittmann, Tegernheim, Germany

[73] Assignee: Krones AG Hermann Kronseder Maschinenfabrik, Germany

[ * ] Notice: This patent is subject to a terminal disclaimer.

[21] Appl. No.: 08/244,003

[22] PCT Filed: Nov. 2, 1993

[86] PCT No.: PCT/EP93/03070

§ 371 Date: May 12, 1994

§ 102(e) Date: May 12, 1994

[87] PCT Pub. No.: WO94/09923

PCT Pub. Date: May 11, 1994

[51] Int. Cl.[7] .......................................... B08B 3/02
[52] U.S. Cl. ........................... 134/113; 134/131; 134/181; 134/201; 198/502.1; 198/794
[58] Field of Search ....................... 134/113, 131, 134/172, 181, 201; 414/146, 222; 198/339.1, 866, 502.1

[56] References Cited

U.S. PATENT DOCUMENTS

| 2,716,473 | 8/1955 | Wehmiller ................................. 198/19 |
| 3,655,122 | 4/1972 | Brown et al. .................... 134/167 C X |
| 3,951,158 | 4/1976 | Tedden ....................................... 134/50 |
| 4,154,624 | 5/1979 | Wahl et al. ................................ 134/10 |
| 4,344,146 | 8/1982 | Davis, Jr. et al. ..................... 901/44 X |
| 4,566,843 | 1/1986 | Iwatsuka et al. ...................... 901/44 X |
| 4,619,133 | 10/1986 | Kautz et al. . |
| 4,638,667 | 1/1987 | Zimmer et al. ........................ 901/44 X |
| 4,657,728 | 4/1987 | Coppa et al. .......................... 901/44 X |
| 4,731,567 | 3/1988 | Dands et al. ............................. 198/794 |
| 4,757,258 | 7/1988 | Kelly, Jr. et al. ...................... 901/44 X |
| 5,065,703 | 11/1991 | Lee ........................................... 134/113 |

FOREIGN PATENT DOCUMENTS

| 226853 | 9/1985 | Germany ............................. 198/502.1 |
| 3517314 | 1/1986 | Germany ............................. 198/502.1 |
| 4105852 | 7/1992 | Japan . |

*Primary Examiner*—Frankie L. Stinson
*Attorney, Agent, or Firm*—Tilton, Fallon, Lungmus & Chestnut

[57] ABSTRACT

In order to be able to carry out in a vessel cleaning machine with a circulating conveyor chain a safe, reliable and fast inspection of the interior of the vessel cleaning machine, an inspection device is arranged on the conveyor chain. The inspection device is provided with sensors and/or cameras.

15 Claims, 2 Drawing Sheets

VESSEL CLEANING MACHINE INCLUDING AN INSPECTION DEVICE

DESCRIPTION

The present invention refers to a vessel cleaning machine according to the generic clause of claim 1.

For examining the wear or rather the condition of the interior of such known vessel cleaning machines, a mechanic climbs into the interior of the machine; before this is possible, the liquid contained in the immersion baths must be drained and some rows of cages must be removed from the machine, and this is disadvantageous. Moreover, due to the darkness and the extremely narrow spatial conditions, the examination of the interior by the mechanic is very unpleasant and it entails danger of accident, such as injuries by puddles of residual suds as well as the risk of bruising by the movable inner parts of the machine. Furthermore, the examination of the interior by the mechanic is very time-consuming.

Hence, it is the object of the present invention to further develop a machine of the type mentioned at the beginning in such a way that the interior of the vessel cleaning machine can be examined safely, reliably and rapidly.

In order to achieve this object, the present invention suggests that an inspection device should be arranged on the conveyor chain of the vessel cleaning machine according to the generic clause of claim 1. By means of said conveyor chain, the inspection device is transported through the interior of the vessel cleaning machine, the condition of the machine being continuously examined in the course of this process. The inspection device is ready for use even if the immersion baths have not been emptied. It is now no longer absolutely necessary to drain the immersion baths for examining the machine. A particularly advantageous aspect is, however, the safe, reliable and rapid performance of the examination of the interior of the vessel cleaning machine.

In order to permit a more effective execution of the examination of the vessel cleaning machine, one embodiment of the present invention is provided with the feature that the inspection device comprises at least one camera and/or a sensor including each an adequate display device. The sensors can operate according to completely different physical methods, e.g. as mechanical sensor means or contactless-operating sensors, such as electromagnetic or capacitive proximity sensors. It will be expedient when data transmission from the camera and/or sensor to the respective display device, e.g. a monitor, is effected in a continuous mode, said data transmission being preferably carried out by wireless transmission, e.g. by radio.

One variant of the present invention discloses the feature that the inspection device comprises at least one camera and/or a sensor and an adequate data memory arranged on said camera and on said sensor, respectively. Also signal lines can thus be dispensed with, whereby the structural design will be simplified. External energy supply lines will also be superfluous, provided that an energy store, e.g. a battery, is carried along with the data memory, the sensor or the camera.

In order to be able to establish a relationship between the measurement results and the interior of the vessel cleaning machine upon evaluating the data, it will be expedient to provide in the interior of the vessel cleaning machine marks which are adapted to be detected by the sensor or the camera. Repair work, which may perhaps be necessary, can thus be carried out purposefully at the right point. In order to permit less difficult repair work to be carried out immediately, a further development of the present invention is provided with the feature that the inspection device additionally includes a controllable device (manipulator) which serves to remedy simple defects.

A further development of the present invention is provided with the feature that at least one carrier means is replaceably arranged on the conveyor chain, said carrier means being constructed such that it is adapted to hold the inspection device. A carrier means which, for example, serves to hold a vessel cleaning device for cleaning the vessel cleaning machine itself can thus be removed from the conveyor chain without any difficulties and subsequently be replaced by the inspection device.

It is also imaginable that the cleaning device and the inspection device are simultaneously attached to different carrier means so that the elimination of contaminations can also be supervised directly.

In order to exclude the possibility that collisions between the passing inspection device and the mechanical system used for inputting and outputting the vessels may occur while said inspection device is passing, said mechanical system is adapted to be automatically disengaged temporarily.

In accordance with an advantageous embodiment of the present invention, the inspection device carrier means can also be constructed such that it is adapted to be inserted into the vessel cleaning machine instead of a row of conveyor cages. This embodiment will be useful in cases in which an examination of the interior is only necessary at certain time intervals, e.g. every day or every week. After the examination process, the carrier means can be removed from the machine and replaced by a row of conveyor cages. This will not cause any reduction of output during normal operation.

Other embodiments and advantages of the device according to the present invention are disclosed by the claims and the description of the embodiments following hereinafter.

The present invention will be explained in detail hereinbelow on the basis of the drawing. The drawing shows an embodiment of the invention.

Figure 1:
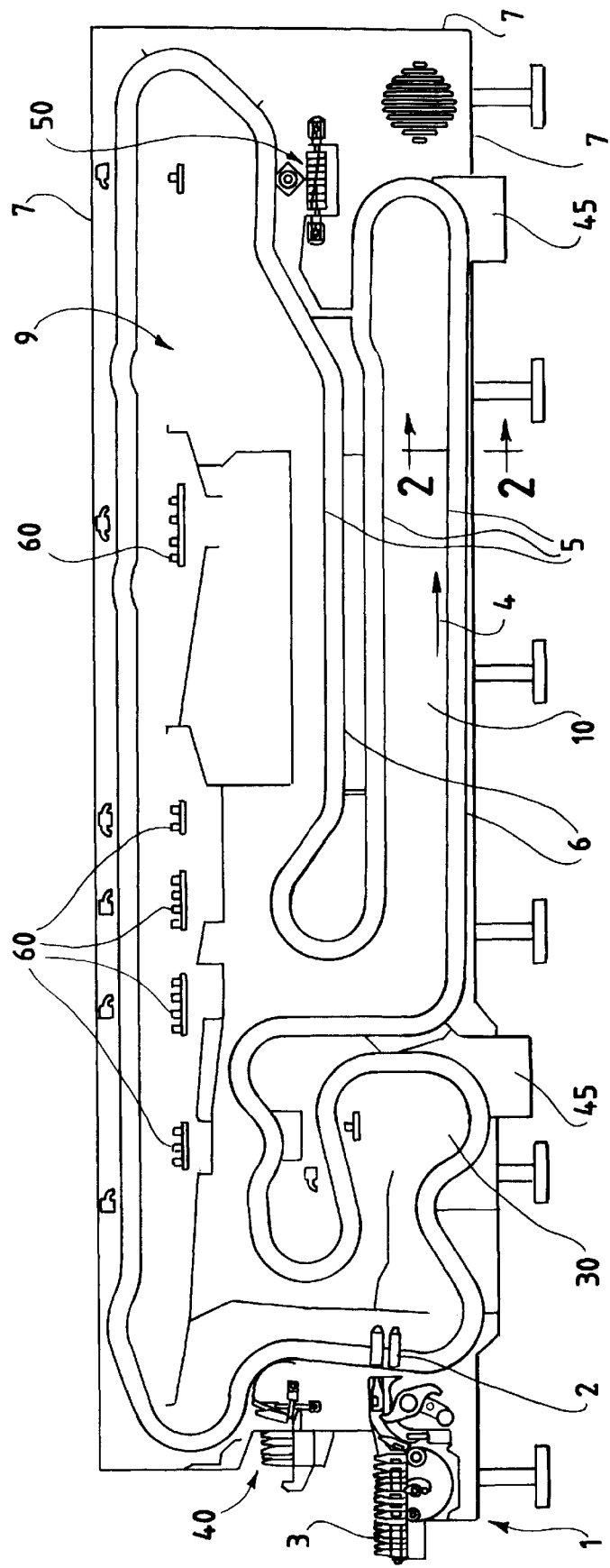
FIG. 1 shows a longitudinal section through a vessel cleaning machine.

The vessel cleaning machine comprises a loading station 1 for the vessels 3 which are to be inserted into the conveyor cages 2, a conveyor chain 5 moving in the direction of transport 4 for conveying the vessels 3 and a guideway 6 consisting of sheet metal and used for supporting the vessels 3 at their base when said vessels pass through the vessel cleaning machine. A housing 7 delimits the machine towards the outside. Within the interior 9 of the vessel cleaning machine, a soaking bath 30, a suds bath 10, discharge means 45 for removing dirt and broken pieces, a discharge means 50 for removing labels, and a plurality of spraying stations 60 are arranged. The cleaned vessels leave the machine at the unloading station 40.

Figure 2:
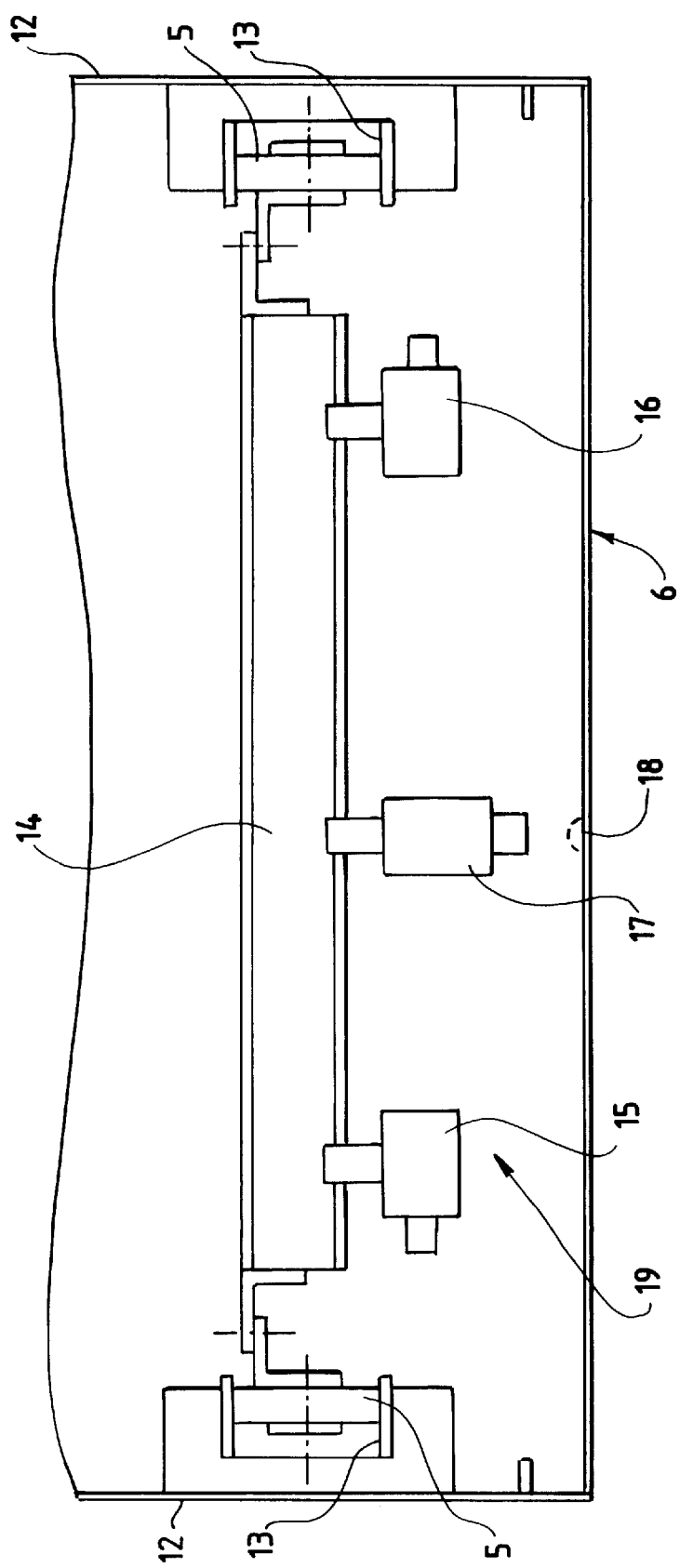
FIG. 2 shows a cross-section along the sectional line A—A in FIG. 1 with an inspection device.

FIG. 2 shows a cross-section through the guideway 6 along the sectional line A—A in FIG. 1. The guideway 6 forms the surface on which the vessels 3 rest, said vessels 3 standing upright in the conveyor cages which are open at the bottom. The guideway 6 is delimited at the sides by side walls 12 extending in the longitudinal direction. Each of the side walls 12 has secured thereto a chain guide means 13 for the conveyor chain 5. A carrier means 14 is replaceably arranged on the conveyor chain 5, said carrier means 14 having secured thereto a camera 15, 16 on either side and a sensor 17 approximately at the centre thereof. Below said sensor 17, a measuring point 18 is arranged on said guideway 6. The cameras 15, 16 and the sensor 17 define an inspection device 19. In order to permit the carrier means 14 to pass the loading station 1 and the unloading station 40 without any collision, the mechanical system used for inputting and outputting the vessels is constructed such that it can be disengaged. Furthermore, the carrier means 14 has provided thereon a controllable device, which serves to remedy simple defects and which is not shown in the drawing. Such a controllable device can be supported on the carrier means 14 such that it is displaceable thereon and it can be actuated from outside in cooperation with a camera, e.g. the cameras 15 or 16.

By means of the cameras 15, 16, the lateral chain guide means 13 can be examined optically with respect to wear, damage or undesirable deposits, such as sludge, bits of lables and broken pieces. For this purpose, searchlights may also be carried along on the carrier means 14 for improving thus the visibility.

The carrier means 14 may also have secured thereto other cameras, which are not shown; the direction of vision of these cameras deviates from that of the cameras 15 and 16 so that also other areas of the machine, such as the discharge means 50 for removing lables, the discharge means 45 for removing dirt and broken pieces, the spraying stations 60, or the surface of the guideway 6 can be optically examined.

The sensor 17 shown in FIG. 2 examines the measuring point 18 on the guideway 6, whereby a reduction of distance caused by wear of the chain guide means 13 can be detected. If the distance is less than a predetermined minimum value, an evaluation means will generate a signal. Undesirable dragging of the conveyor cages 2 along the guideway 6 is thus avoided. The guideway 6 may have provided thereon several measuring points 18 of this type which are arranged one behind the other in the direction of transport 4.

The inspection device 19, which consists of the cameras 15, 16 and of the sensor 17, can be in action while the vessel cleaning machine is in operation. The cameras and the sensor are protected against an ingress of liquid and agressive substances, such as cleaning suds. This permits a safe, reliable, fast and continuous inspection of the interior of the vessel cleaning machine. It is, however, just as well imaginable to carry out an examination of the interior when the machine is not in operation, e.g. in connection with cleaning operations in a condition in which the immersion baths have been emptied. In this case, simpler and less expensive sensors and cameras may be used, which need not be specially protected.

I claim:

1. A cleaning machine for cleaning bottles (3) having arranged within a housing (7) at least a dipping station (30, 40), a spraying station (60), a loading station (1), an unloading station (40), and a circulating conveyor chain (5) for conveying bottles (3) from said loading station (1) through said dipping station (30, 10) to said spraying station (60) and to said unloading station (40), wherein an inspection device (19) is arranged on said conveyor chain (5).

2. A machine according to claim 1, wherein said inspection device (19) comprises at least one camera (15, 16) and/or a sensor (17) including for each an adequate display device.

3. A machine according to claim 1, wherein said inspection device (19) comprises at least one camera (15, 16), in particular a video camera, and/or a sensor (17) and an adequate data memory arranged on said camera or cameras (15, 16) and on said sensor (17), respectively.

4. A machine according to claim 2 wherein said circulating conveyor chain passes over a guide way (6) which includes meaning points (18), said sensor (17) being adapted to measure a distance between said sensor (17) and said measuring points (18) on said guide way (6).

5. A machine according to claim 2 wherein said at least one camera (15, 16) is positioned to view a drive means for driving said circulating conveyor chain (5).

6. A machine according to claim 1, 2, or 3, wherein measuring points (18), which are adapted to be detected by said sensor (17) or said camera (15, 16), are provided in the interior (9) of the vessel cleaning machine.

7. A machine according to claim 1, 2, or 3, wherein said inspection device (19) has associated therewith a controllable device which serves to remedy simple defects and/or to clean the machine.

8. A machine according to claim 1, 2, or 3, wherein said conveyor chain (5) has arranged thereon at least one carrier means (14) which is constructed such that it is adapted to hold said inspection device (19), said carrier means (14) being preferably connected to said conveyor chain (5) such that it is replaceable.

9. A machine according to claim 1, 2, or 3, wherein the vessel cleaning machine comprises a loading station (1) and an unloading station (40) with a mechanical system used for inputting and outputting the vessels which is constructed such that it can be disengaged.

10. A machine according to claim 9, wherein the disengagement and the subsequent reengagement of said mechanical system used for inputting and outputting the vessel takes place automatically while said inspection device is moving past said mechanical system.

11. A machine according to claim 2 or 3, wherein said inspection device (19), and especially said camera (15, 16), has associated therewith a light emitting means or that said light emitting means is integrated therein.

12. A machine according to claim 2 or 3, wherein said inspection device (19), and especially said camera (15, 16), has associated therewith a power supply means which is adapted to be carried along or that said power supply means is integrated therein.

13. A machine according to claim 2 or 3, wherein said inspection device (19) and especially said camera (15, 16) and/or said sensor (17), is connected to a said display device, and that the transmission of data is preferably carried out by wireless transmission, in particular in a continuous mode.

14. A machine according to claim 1, 2, or 3, wherein said inspection device (19) includes video cameras (15, 16).

15. A machine according to claim 13, wherein said display device is a monitor.

* * * * *